United States Patent [19]

Shoup

[11] 4,271,995
[45] Jun. 9, 1981

[54] METHOD AND APPARATUS FOR MAKING FISHING LURE WINGS

[76] Inventor: Robert E. Shoup, Lot #11, Muleshoe Cts, R.D. #5, Duncansville, Pa. 16635

[21] Appl. No.: 55,555

[22] Filed: Jul. 9, 1979

[51] Int. Cl.³ .......................................... A41H 43/00
[52] U.S. Cl. ...................................... 223/47; 43/42.25
[58] Field of Search ............... 223/47; 43/42.24, 42.25

[56] References Cited

U.S. PATENT DOCUMENTS

| | | | |
|---|---|---|---|
| 556,166 | 3/1896 | Roston | 223/47 |
| 1,767,175 | 6/1930 | Glass | 81/43 |
| 1,989,632 | 1/1935 | Calvert | 5/484 |
| 2,209,096 | 7/1940 | Sherer | 43/48 |
| 2,350,572 | 6/1944 | Schweigert | 43/48 |
| 2,535,717 | 12/1950 | Bennett | 30/299 |
| 2,559,434 | 7/1951 | Hyland | 33/174 B |
| 3,017,307 | 1/1962 | Halliburton | 156/72 |
| 3,930,329 | 1/1976 | Burkhardt | 43/4 |

OTHER PUBLICATIONS

The Orvis Catalog; Spring 1979; p. 71; The Orvis Company, Manchester, Vermont 05254.
"Burning Wings" by Ted Niemeyer, printed in Fly Fisherman, 1978 WinterIssue; vol. 10, No. 1 Oct./Nov., pp. 82, 84, 87 and 89; published by Ziff-Davis Publishing Co., One Park Ave., N. Y., N. Y. 10016.

Primary Examiner—Louis Rimrodt
Attorney, Agent, or Firm—Stanley J. Price, Jr.; John M. Adams

[57] ABSTRACT

A wing former includes a pair of cooperating, spring arm members positioned in overlying spaced relation and movable between an open and closed position for receiving a wing forming material, such as a feather or a thin sheet material for shaping a wing of an artificial fishing lure. Each arm member has a first end portion and a shaped second portion with the first end portions being connected for pivotal movement of the arm members. The wing forming material is inserted between the second end portions. Each second end portion has a configuration corresponding to a preselected wing configuration to be formed. Reference markers on at least one of the shaped end portions facilitate selective positioning of the wing forming material between the shaped end portions. With the material in a preselected position, the shape of the wing is controlled so as to permit construction of a wing that accurately imitates the shape of the wing of an insect of a preselected species. This feature also assures a stable wing construction for continual use of the lure. After the wing is shaped, the material is drawn through an opening in one of the arm members to remove excess material remaining on the periphery of the shaped wing.

21 Claims, 35 Drawing Figures

METHOD AND APPARATUS FOR MAKING FISHING LURE WINGS

BACKGROUND OF THE INVENTION

1. Field of the Invention

This invention relates to a method and apparatus for forming the wings of a fishing lure and more particularly to a wing former for constructing artificial fly wings of a preselected shape and size and having improved stability for continual use.

2. Description of the Prior Art

It is well known in the manufacture and assembly of artificial fishing lures, such as the winged lures used in fly fishing, to construct the wings of the lure from natural material, such as fowl feathers, and thin sheet material, such as a sheet of synthetic resin, cellulose material or material fabricated of rubber hydrochloride, as disclosed in U.S. Pat. No. 1,989,632. The wings and the other component parts of a fly are selected in shape, size, form and color to imitate and simulate the insects or bait upon which fish naturally feed. Therefore, the degree to which the artificial lure simulates a natural insect determines to a great extent the ability of the angler to catch fish using the lure. Consequently, the various parts of the fly, such as the feathers, streamers, wings and body portion must be carefully shaped and assembled along the shank of the hook so as to conceal to some extent the point of the hook.

One of the known commercially available devices for forming the wings of a fly is the wing burner sold by Orvis Company, Inc., of Manchester, Vt., as disclosed and described in the Orvis Spring, 1979 Catalog, Page 71. A wing is cut by placing a feather between the shaped end portions of the wing cutter. The tweezer-like arms of the cutter are pressed together thereby squeezing the feather between the end portions to tightly hold the feather in place. A flame, as for example from a butane lighter, is held in contact with the exposed portions of the feather projecting outwardly from between the shaped end portions. The excess material is burned off to construct a wing from the feather in accordance with the profile of the shaped end portions. The wing is then tied in the well known manner to extend from the hook to simulate the wing of an insect.

U.S. Pat. No. 2,535,717 discloses a wing cutter for cutting feathers for use in fishing lures. The wing cutter includes a U-shaped blade having a convex cutting edge. The edge is adapted to be rocked for cutting the feather at a selected point. As disclosed, the barbs of the feather quill are cut in substantially the shape of a parabola. The length of the wing may be subsequently trimmed by breaking the barb from the quill or cutting the barbs with a sharp blade leaving a sufficient portion of the quill for securing the feather to the lure.

U.S. Pat. No. 2,209,096 discloses the forming from artificial materials an "eye" feather that is exhibited by spots or bands of contrasting colors. Preferably, the artificial material is a thin sheet of Celluloid having water resistant properties and desirably colored to simulate the natural eye feathers. The artificial feather is cut from the thin sheet by a suitable die or cutter having an outline conforming to the desired size and shape of the feather to be formed.

As stated above, the wings may be cut from natural materials such as a bird feather or from synthetic materials as disclosed in U.S. Pat. No. 2,350,572. This patent discloses a wing construction and method of forming a wing for artificial lures from a transparent or translucent, tough sheet material marketed under the trade name "PLIOFILM". It is also disclosed that sheets of synthetic resin or cellulosic material, such as viscose, may be used. Such material is known to be light weight but sufficiently durable to maintain its simulation of a fly wing when cast into the water and retrieved from the water.

Also in U.S. Pat. No. 2,350,572 sheets of synthetic material are arranged in a laminated fashion and may include colored strands or cords of suitable material to simulate veining or stripping found in the wings of insects. It is also disclosed that the veining provides additional strength and stability to the wing so as to maintain the wing not too rigidly or stiffly in position. Further, as disclosed in U.S. Pat. No. 2,350,572 the laminated sheet is cut by means of suitable dies to produce a dual wing unit that includes two wings joined by a narrow portion which is secured to the hook in assembling the fly. The wings project upwardly from the shank of the hook in a natural manner.

There is need for a wing forming apparatus which permits the forming of a fishing lure wing of a preselected size and configuration from both natural materials, such as feathers, and sheet materials, such as cloth and synthetic translucent film material. While it has been suggested to form wings having a preselected configuration simulating insect wings, the prior art devices do not solve the problem of precisely shaping the wing to simulate the wing of a particular insect without requiring a great deal of expertise in wing shaping. In addition, the known wing cutting, shaping and forming devices do not solve the problem of constructing a feather wing which is capable of withstanding repeated use and being played in the water to accurately imitate the movement of an insect.

SUMMARY OF THE INVENTION

In accordance with the present invention, there is provided apparatus for forming the wings of a fishing lure that includes a pair of cooperating arm members positioned in overlying spaced relationship. The arm members each have a first end portion and a second end portion. The first end portions are connected for pivotal movement of the arm members to move the second end portions toward and away from each other. The second end portions are adapted to receive a wing forming material therebetween. The arm members are movable between an open position where the second end portions are spaced apart and a closed position where the arm members are abutting. The second end portions each has an identical configuration corresponding to a preselected wing configuration. An alignment device is provided on at least one of the arm member second end portions for selectively positioning the wing forming material between the second end portions in the closed position to retain the wing forming material in a preselected position between the second end portions to thereby control the shaping of the wing.

Further, in accordance with the present invention, there is provided a method for forming the wing of a fishing lure that includes the step of inserting the wing forming material between the shaped end portions of a pair of cooperating arm members. The wing forming material is placed in abutting relation with one of the arm member end portions. The wing forming material is then aligned with the reference markers on the arm member end portion to control the position of the wing forming material to obtain a preselected wing configuration. Thereafter, the arm member end portions are urged into abutting relation to secure the wing forming material therebetween. The wing forming material is maintained between the arm member end portions in alignment with the reference markers. The material surrounding the arm member end portions is removed to thereby form a wing of a preselected configuration.

The wing forming apparatus of the present invention is adaptable for constructing wings from a natural material, such as bird feathers, as well as from artificial or synthetic materials, such as thin plastic transparent or translucent sheets. In one embodiment of the present invention, the alignment device includes an opening that extends through at least one arm member adjacent the end portion thereof. The opening may be formed by a slot extending from an edge of the arm member into the arm member body portion and terminating in an end portion. The quill portion of a feather is adapted to extend through the opening or moved into the slot to the end portion thereof so as to anchor one end portion of the feather in a fixed position.

The opposite end portion of the feather is extended across the surface of one of the shaped end portions and engaged within a recess or notch provided at the end of the arm end portion to securely position the opposite end of the feather. By holding the quill securely in the notch and pulling on the end of the quill opposite the opening in the arm member, the quill is tensioned and moved into a position on the arm member for selectively locating the quill to provide the shaped wing with maximum stability to retain the feather in a wing shape after continued use.

Once the feather has been selectively positioned so that the quill is in alignment with the reference points, the arm members are squeezed together to securely clamp the feather between the end portions. The wing is then shaped by contacting the portions of the feather extending outwardly form between the end portions with a flame. The exposed material is burned away and the material remaining is thus shaped to conform to the profile of the end portion. To remove the particles that may remain on the periphery of the formed wing to complete the wing forming operation, the wing is pulled through the opening in the arm so as the wing passes through the opening and contacts the body of the arm, the excess material is dislodged and the result is a precisely formed wing free of excess material.

The present invention is also operable to form a dual wing from a thin sheet of material. The material is folded and positioned between the arm members on the inside surface of one arm member end portion. The folded edge of the material is moved into alignment with a reference line that extends transversely across the arm member and spaced a preselected distance from the tip of the respective end portion. Once the material is properly aligned on the end portion, the arm members are squeezed together to securely clamp the material in place. By cutting around the periphery of the shaped end portions with a knife edge, the material extending outwardly from between the end portions is removed. The material remaining between the end portions is thus shaped with a profile corresponding to that of the arm end portions. By selectively aligning the material with the reference point, the dual wings are connected by a portion having the proper length for mounting the dual wing unit on the shank of the lure.

Accordingly, the principal object of the present invention is to provide a method and apparatus for forming the wings of a fishing lure by a pair of cooperating spring arm members having oppositely positioned shaped end portions conforming to a desired wing configuration with means for controlling the position of the material between the end portions for selective shaping of a wing.

Another object of the present invention is to provide a wing forming method and apparatus operable to construct fishing lure wings from both natural and synthetic materials in a manner where the wings have a precisely controlled shape and size.

Another object of the present invention is to provide a wing forming apparatus having means for aligning and guiding the wing forming material into a preselected position for constructing a wing of a desired configuration.

An additional object of the present invention is to provide a wing forming apparatus and method adaptable to remove excess material and complete the wing forming operation.

These and other objects of the present invention will be more completely disclosed and described in the following specification, the accompanying drawings and the appended claims.

BRIEF DESCRIPTION OF THE DRAWINGS

FIG. 19 is a schematic illustration of a dual wing unit in accordance with the present invention, illustrating a web portion connecting the pair of wings.

FIG. 20 is a schematic view of the dual wing unit having the web portion shaped for mounting on the shaft of the hook.

FIGS. 21-23 schematically illustrate a set of wing forming devices, illustrating a range of sizes for the shaped end portions to construct a wing of a preselected size corresponding to a preselected hook size.

DESCRIPTION OF THE PREFERRED EMBODIMENTS

Referring to the drawings and particularly to FIGS. 1-4, there is illustrated a wing forming apparatus generally designated by the numeral 10 that includes a pair of cooperating spring arm members being integrally formed, as for example from spring steel. Each arm member 12 and 14 includes a first end portion 16 and a second end portion 18 where the first end portions 16 are connected by an arcuate portion 20 to permit pivotal movement of the arm members 12 and 14 and particularly the second end portions 18 toward and away from each other in a tweezer-type action.

Figures 1, 2, 3, 4, 5, 6, 7, 8, 9, 10, 11:
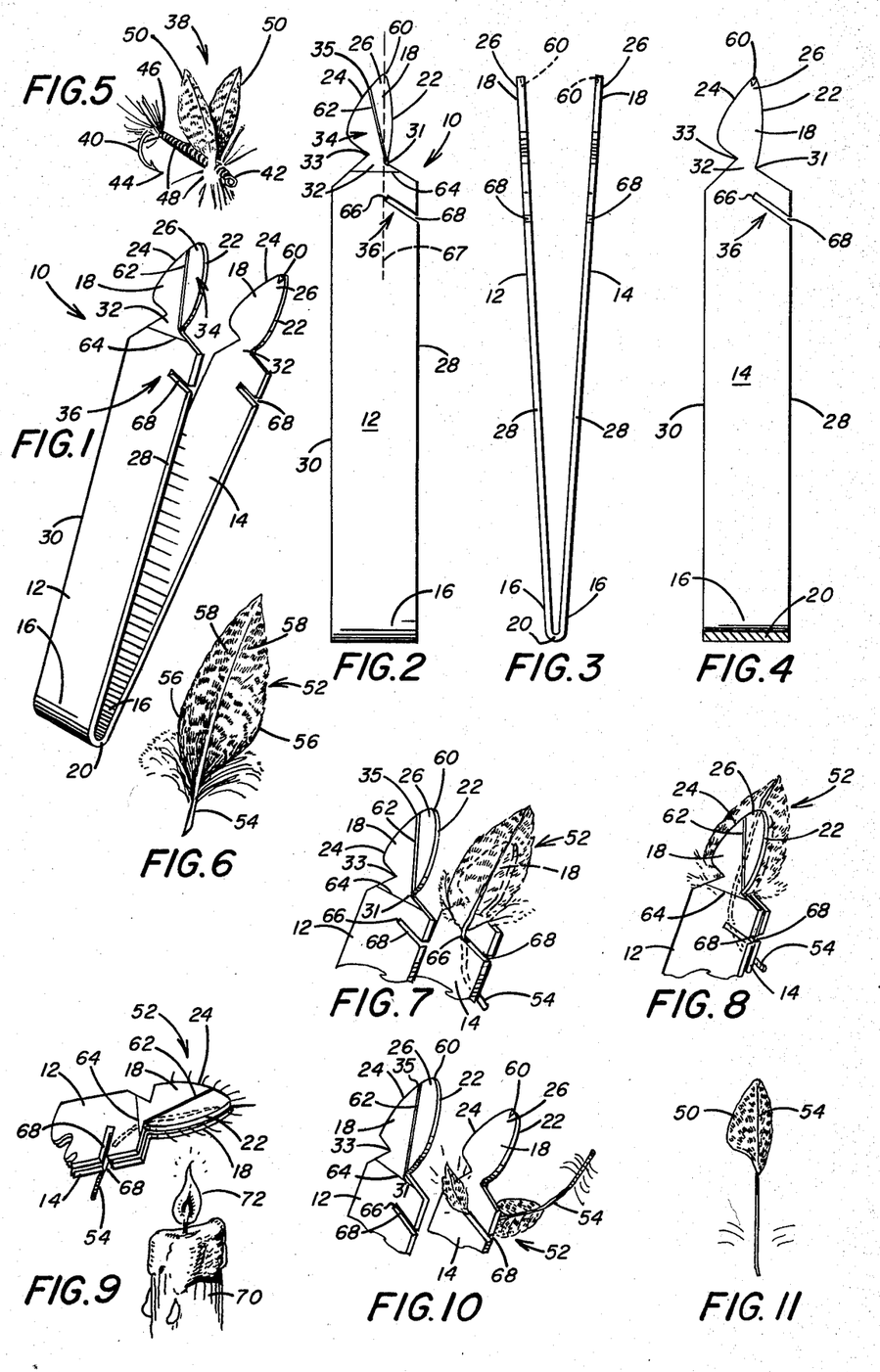
FIG. 1 is a perspective view of the wing forming apparatus, illustrating a pair of cooperating spring arm members having preselected shaped end portions with means for aligning the wing forming material in a selected position between the end portions.
FIG. 2 is a view in side elevation of the wing forming apparatus shown in FIG. 1.
FIG. 3 is an end view of the wing forming apparatus, illustrating the arm members in a normally open position.
FIG. 4 is a sectional view of the wing forming apparatus, illustrating the inner surface of one of the arm members.
FIG. 5 is a perspective view of a fly-type fishing lure, illustrating feather wings constructed by the wing forming apparatus of the present invention.
FIG. 6 is a perspective view of a feather used for making a wing for the fly illustrated in FIG. 5.
FIG. 7 is a schematic representation of the method of securing the feather in position on an arm member to construct a wing from the feather.
FIG. 8 is a schematic view of the arm members urged together to securely clamp the feather in proper alignment between the shaped end portions.
FIG. 9 schematically illustrates the step of shaping the wing by burning the portion of the feather extending outwardly from between the end portions.
FIG. 10 schematically illustrates the step of drawing the formed wing through an opening in one of the arm members to extract the formed wing and remove any excess material.
FIG. 11 is a schematic illustration of a wing formed from a feather in accordance with the present invention.

The arm member second end portions 18 are shaped in accordance with a preselected configuration corresponding to the desired configuration of a wing for a lure, such as an artificial fly, to be constructed in accordance with the present invention. Each of the shaped end portions 18 has a leading edge 22 of a preselected curvature and a trailing edge 24 also of a preselected curvature, which is preferably more sharply curved than the leading edge. The edges 22 and 24 converge at the uppermost end portion of each of the arms to form an apex 26. At the opposite end the edges 22 and 24 connect with lateral edges 28 and 30 of each arm member respectively to form a neck 32 to provide the transition from the body of the arm members to the body of the shaped end portions. The leading edge 22 connects with the neck 32 at point 31, and the trailing edge 24 connects with the neck 32 at point 33. Points 31 and 33 and the bottom of trailing edge 24 are aligned on a diagonal extending across each arm member end portion. Each of the arm member end portions is provided with an aligning device generally designated by the numeral 34 and a wing cleaning and extraction device generally designated by the numeral 36. The aligning device 34 includes, as illustrated in FIG. 2, the diagonal reference line 62, the horizontal reference line 64, and dashed vertical reference line 67 formed by the reference points 60, 31, and 66. These features as well as the wing cleaning and extraction device 36 will be described later in greater detail.

Referring to FIG. 5, there is illustrated a fishing lure generally designated by the numeral 38 of the artificial fly-type. The artificial fly includes a hook 40 having at its forward end a loop 42 for attachment to a leader or line and at its rearward end a point 44. The hook 40 includes a shank 46 extending between the loop 42 and the point 44. An arrangement of feathers, streamers, strands and the like are tied in the customary manner to the shank 46 by a thread 48 which is tightly wound around the shank from the loop 42 to the curved portion of the hook 40.

The feathers are arranged on the shank to substantially conceal the shank and imitate an insect of a particular variety and size. The typical fly includes a pair of wings 50 that are tied to the shank adjacent the loop opposite one another and arranged to extend upwardly and rearwardly in a fashion that imitates the wing of an insect. As well known in the art, the wings 50 may be individually formed from natural materials, such as feathers obtained from various areas of a bird or other fowl. FIG. 6 illustrates a typical feather generally designated by the numeral 52 for use in making artificial fly wings. The feather includes a central quill 54 to which is connected a plurality of barbs 56. The barbs 56 extend ourwardly from each side of the quill which is centrally positioned on the feather to form a continuous vane 58 on each side of the quill.

In accordance with the present invention, the feather as for example, feather 52, is securely positioned in clamped engagement with the shaped end portions 18 in a preselected alignment for controlling the position of the quill 54 on a formed wing. The quill 54 of the feather is selectively positioned so that in the formed wing, as illustrated in FIG. 5, the quill is adjacent the leading edge of the wing corresponding to the shaped end portion leading edge 22 to provide a durable feather capable of holding its shape after continued use. This arrangement also ensures that the wing will maintain its simulation of an insect wing when drawn through the water.

As illustrated in FIG. 6, the quill is centrally positioned between the vanes 58, but as illustrated in FIG. 5, the wing 50 is formed so that the quill 54 is closer to the leading edge of the wing than the trailing edge of the wing. This arrangement provides the wing with increased stability to resist matting when exposed to water. The selective shaping of the fly wings 50 from the feather 52 is provided by the configuration of the shaped end portions 18 in cooperation with the aligning device 34.

The aligning device 34 includes a plurality of reference points 60 and 66 and reference lines 62 and 64, as well as, reference points 31 and 33 discussed above provided on each of the arm member end portions 18. The reference point 66 is also associated with the cleaning and extraction device 36, which includes an opening 68 extending through each arm member adjacent the shaped end portion thereof. The opening 68 as illustrated in FIGS. 1, 2 and 4 is in the form of a slot that extends diagonally from the upper central portion of each arm member to the lateral edge portion 28. The slot 68 has an open end portion for receiving the feather, as well be explained later in greater detail, and a closed end portion for guiding one end of the feather quill 54 into a preselected position relative to the shaped end portion. It will also be apparent that the opening 68 may be in the form of an aperture of a preselected diameter extending through the arm member. It will be noted that reference points 60, 31, and 66 form a reference line 67, as indicated by the dashed line in FIG. 2. The reference line 67 is a vertical line offset from the longitudinal axis of arm member 12 and parallel to said longitudinal axis. However, line 67 may also be at an angle to said axis.

The reference line 64 extends substantially transversely across the neck 32, and the reference line 62 extends on the shaped end portion 18 substantially diagonally from the neck 32 at point 31 on the leading edge 22 upwardly and rearwardly to a selected point, such as point 35, on the trailing edge 24. The reference point 60 is preferably formed by a recessed portion or indentation on the inside surface of at least one arm member end portion at the apex 26. The indentation 60 is arranged to receive a second point of the feather quill 54 so that when the feather is clamped between the shaped end portions 18 and the quill 54 is tensioned, the quill extends in a straight line form the closed end of the slot 68 to the indentation 60. The quill 58 thus is aligned with the reference points 60 and 66 along the reference line 67 and passes through the area opposite point 31 between the shaped end portions 18. In this manner, the quill when the wing is formed is positioned closely adjacent in spaced relation to the leading edge of the wing as illustrated in FIG. 5.

The feather quill 54 is positioned on a shaped wing 50 in accordance with the present invention to support the barbs that form the leading edge of the wing so as to resist matting and collapsing of the wing when the lure is drawn through the water. In comparison, if the quill 54 of the feather were centrally positioned on the formed wing 50, the leading edge of the wing would be insufficiently supported to maintain its fanned out configuration after repeated casting and retrieving through the water. Consequently, the fly loses its ability to imitate the animations of an insect in the water. The reference lines 62, 64, and 67 are also operable to selectively align the wing forming material between the shaped end portions to control the shape of the formed wing, as well be explained later in greater detail.

Referring to FIGS. 7-11, there are illustrated the various steps in the operation of forming a wing from a natural feather using the wing forming apparatus 10. Initially, as illustrated in FIG. 7, the feather 52 is inserted between the end portions 18 of the arm members 12 and 14. The feather is placed on the inner surface of one of the end portions, as for example, the end portion of arm 14 with the quill 54 of the feather advanced through the open end portion of the slot 68 to the closed end portion or reference point 66. The feather is extended the length of the end portion 18 to the indentation or reference point 60 where the quill is received and secured in place.

It will be apparent from the present invention that the reference point 66 formed by the closed end of the slot 68 and the indentation 60 form the reference line 67 closely adjacent but spaced from the leading edge 22 of the shaped end portion 18. The position of the feather on the shaped end portion is adjusted so that the quill 54 overlies the reference line 67 formed by the reference points 60 and 66. In this manner, the position of the quill 54 on the shaped wing is controlled to obtain a stable wing construction.

In order to securely maintain the feather in the desired alignment on the shaped end portions 18, the arm member portions 12 and 14, as illustrated in FIG. 8, are urged into a closed position. When the end portions are clamped together, the position of the feather is finally adjusted by exerting tension on the end of the quill extending outwardly from the arm member slot 68 and further on the upper end of the feather above the apex 26 of the end portion 18 so that the quill is moved into the indentation 60. Thus the feather 52 is securely clamped in a position between the shaped end portions where the quill 54 extends along a substantially straight line from the indentation 60 through the area adjacent reference point 31 to the closed end 66 of the diagonal slot 68.

While maintaining the feather 52 in the preselected aligned position between the shaped end portions 18, the feather is shaped to form the wing 50 by the burning operation illustrated in FIG. 9. As illustrated, the feather is held in contact with a flame 72, as for example from a candle 70 or from a portable butane lighter (not shown) to burn the exposed portion of the feather. The portion of the feather retained between the closed end portions is concealed from the flame and remains intact.

In this manner the feather 52 is shaped to conform with the profile of the shaped end portions 18.

After the burning operation is completed, the excess material, such as carbon particles remaining on the periphery of the shaped feather, are efficiently removed by extracting the shaped feather from between the arm members 18 by drawing the feather through the constricted opening 68. The vanes 58 of the feather 52 are compressed as they are drawn through the opening 68 into contact with the portions of the arm members 12 and 14 surrounding the opening 68. The burned particles remaining on the wing periphery are dislodged. After the burning operation, the feather barbs 56 remaining attached to the quill 54 at a point below points 31 and 33 on the shaped end portions 18 are stripped away. In this manner a wing of a length corresponding to a preselected hook size and having a preselected configuration is formed. The wing is shaped so that the quill is in the desired position on the formed wing to provide increased stability yet simulate the shape of an insect wing.

It will be apparent that reference points 31 and 33 on the shaped end portions 18 are aligned on somewhat of a diagonal with the bottom edge of the trailing edge of the formed wing. This diagonal reference line intersects the point where the leading edge of the formed wing meets the feather quill 54. Thus the diagonal reference line serves as a guide for removing from the quill 54 the feather portions not removed by the burning operation.

Figures 12, 13, 14, 15, 16, 17, 18:
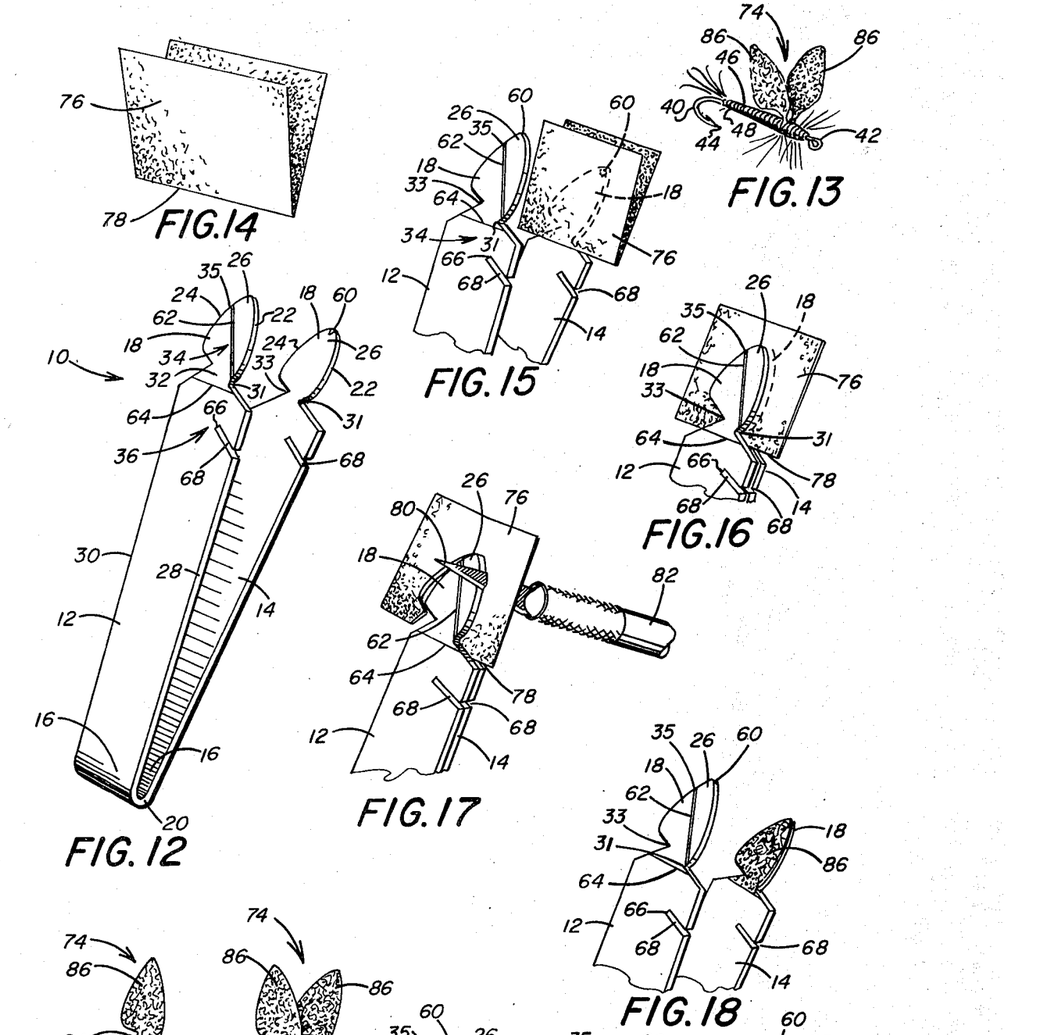
FIG. 12 is a perspective view of the wing forming apparatus similar to FIG. 1, illustrating means for positioning and selectively aligning a thin sheet between the shaped end portions.
FIG. 13 is a perspective view of a fly-type fishing lure, illustrating a dual wing unit formed from a thin sheet of material.
FIG. 14 is a schematic illustration of the sheet material folded for forming the dual wing unit.
FIG. 15 is a schematic representation of the initial step of positioning the folded sheet material between the shaped end portions to form the dual wing unit.
FIG. 16 is a schematic representation of the wing former in a closed position to securely retain the folded material in a preselected position between the shaped end portions.
FIG. 17 schematically illustrates the step of shaping a wing from the sheet material by cutting around the periphery of the shaped end portions to form the wing.
FIG. 18 is a schematic representation of the arm members in an open position after the wing has been shaped, illustrating the configuration of the wing on one end portion and conforming to the configuration thereof.

Further in accordance with the practice of the present invention, a dual wing assembly generally designated by the numeral 74 is illustrated in FIG. 13. The dual wing assembly 74 is formed by the wing forming apparatus 10, illustrated in FIG. 12, from a folded sheet of thin material 76, illustrated in FIG. 14. The thin sheet material 76 is a commercially available material and is preferably water-proof, or treated to be water resistant, having sufficient strength and stiffness to resist tearing.

A suitable material for making the dual wing assembly 74 is Celluloid. Other suitable materials include viscose, a synthetic resin, or a rubber derivative product such as "Pliofilm" which is a cellulose material as described in U.S. Pat. No. 1,989,632. Preferably, the thin sheet material is transparent or translucent to form a surface that simulates the wing of an insect.

The wings formed from the sheet material 76 may either be made as single units or dual units, as illustrated by the formed wing in FIG. 20. For the dual wing unit, a web must be provided for connecting the pairs of wings and for tying the wings to the shank 46 of the hook 40, as illustrated in FIG. 13. In order to provide the dual wing assembly 74 with a correctly dimensioned web, the edge 78 of the folded sheet is placed in alignment with the reference line 64 that extends transversely across the neck 32 of an arm member. A reference line 64 is provided externally on each arm and the folded edge 78 is positioned oppositely of the reference line on the inside of the arm.

The reference line 64 is positioned on the arm so as to provide the web with the required length to extend around the hook shank to support the dual wing unit in a position simulating the wings of an insect. Once the folded edge 78 is aligned with the reference line 64, the arm members are urged together to securely clamp the sheet material between the shaped end portions 18. The secured position of the sheet material 76 between the shaped end portions 18 is illustrated in FIG. 16.

The wing shaping operation is accomplished, as illustrated in FIG. 17, by cutting the sheet material around the periphery of the shaped end portion with a knife edge 80 of a cutting instrument 82. Only the portion of the sheet material between the end portions, as illustrated in FIG. 18, remains after cutting the sheet material around the periphery of the end portions. A dual wing assembly is thus formed with a profile conforming to profile of the shaped end portions. The arm members are released and moved to the open position as illustrated in FIG. 18 for removing the shaped dual wing assembly 74.

The initially shaped dual wing assembly 74, illustrated in FIG. 19, includes a web 84 connecting the pairs of wings 86. The web 84 has outwardly flared end portions 88 and 90 which must be trimmed off. To provide the correct width of web 84, the material is cut along the lines 92 and 94. Lines 92 and 94 are spaced a distance apart corresponding to the distance between points 31 and 33 on the shaped end portions 18. The finally shaped dual wing unit is illustrated in FIG. 20. It will be apparent from the present invention that the feather wing 50 may be formed by the cutting method, as well as, by the burning method, and similarly the dual wing unit 74 may be formed by the burning method, as well as, by the cutting method.

Figure 24:
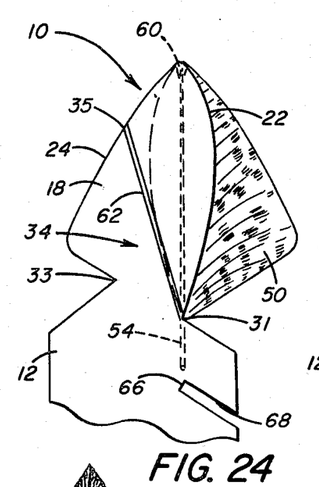
FIG. 24 is a schematic illustration of the method step of positioning an initially formed feather wing in a selected position on an arm member end portion to alter or modify the initially formed wing shape to a further predetermined wing shape.
Figures 24A, 25A, 26A, 27, 27A, 28, 28A, 29, 29A:
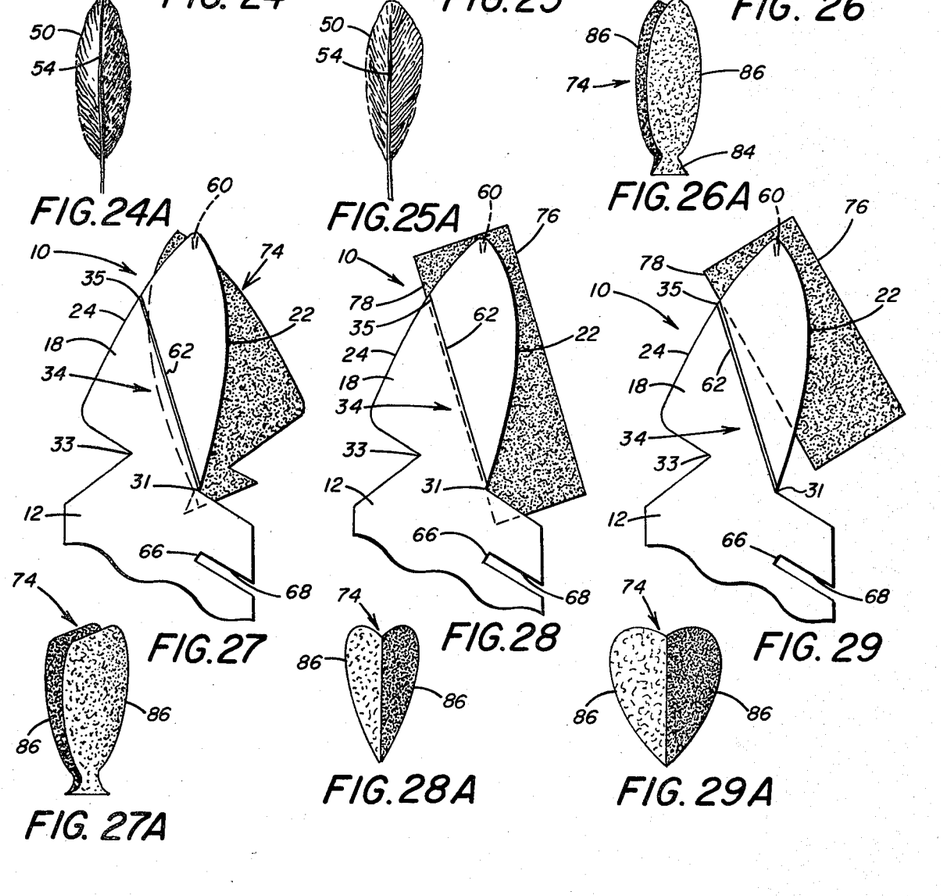
FIG. 24A schematically illustrates the feather wing formed when an initially formed wing is located between the arm members in the position shown in FIG. 24.
FIG. 25A schematically illustrates the feather wing formed when an initially formed wing is positioned in the manner shown in FIG. 25.
FIG. 26A schematically illustrates the shape of a dual wing unit formed when an initially formed unit is positioned on an arm member end portion as shown in FIG. 26.
FIG. 27 schematically illustrates an additional method step for modifying the shape of an initially formed dual wing unit.
FIG. 27A schematically illustrates the shape of the dual wing unit formed as a result of the method shown in FIG. 27.
FIG. 28 schematically illustrates the initial method step of positioning the folded sheet material in alignment with a diagonal reference line on an arm member end portion to obtain an initial dual wing unit of a preselected configuration.
FIG. 28A schematically illustrates the shape of the dual wing unit formed in accordance with the method step shown in FIG. 28.
FIG. 29 schematically illustrates a further method step for initially forming a dual wing unit of a preselected configuration by selective positioning of the folded material between the arm member end portions.
FIG. 29A schematically illustrates the shape of the dual wing unit formed in accordance with the method step shown in FIG. 29.
Figures 25, 26:
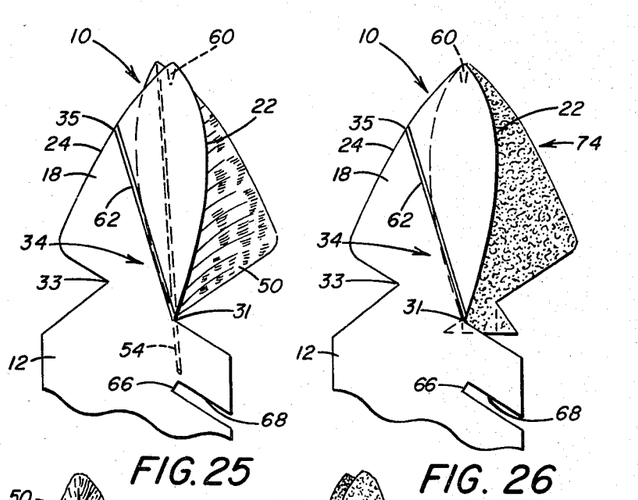
FIG. 25 is a schematic illustration similar to FIG. 24, illustrating an additional method step for modifying a preshaped feather wing.
FIG. 26 is a schematic illustration of the method step of positioning an initially formed dual wing unit in a selected position on an arm member end portion to selectively modify the shape of the initially formed dual wing unit.

Further, as illustrated in the drawings and particularly in FIGS. 25, 27, 28 and 29 each of the shaped end portions 18 on the outer surface thereof is provided with the reference line 62 that extends diagonally from the reference point 31 on leading edge 22 to an upper point 35 on the trailing edge 24. The use of angled reference line 62 permits additional shaping of a single wing constructed from a feather, as illustrated in FIG. 25, and of a dual wing assembly constructed from sheet material, as illustrated in FIGS. 27, 28, and 29. In this manner, a formed wing can be constructed to simulate the wing of a particular insect such as the wing of an adult stonefly, a caddis, a stonefly nymph, and others.

For example, the wing shown in FIG. 24A can be constructed from the shaped single wing 50, illustrated in FIG. 11, by positioning the preshaped wing 50 in an inverted position between the shaped end portions 18 where the trailing edge of the wing 50 extends beyond the leading edge 22 of the end portions 18 with the remaining portion of the wing between the end portions. The quill 54 of the formed wing is aligned with reference points 31 and 60. The wing 50 is maintained in this adjusted position and the excess material extending from the leading edge 22 is removed by burning or cutting. The shaped wing 50 is then extracted to form a final wing configuration shown in FIG. 24A where the quill 54 is centrally positioned between the shaped vanes of the feather.

In addition, another variety of insect wing having a known configuration may be formed by inserting an initially formed feather wing 50 in an inverted position as above described. As illustrated in FIG. 25, the leading edge of the wing is selectively positioned with respect to the reference line 62 and reference point 35. The lower end of the feather 50 is positioned at point 31 and the upper tip of the feather preferably is selectively positioned to project beyond the trailing edge portion 24 of shaped end portion 18 at a point between reference points 35 and 60. It will be apparent, however, that the tip of the feather 50 may be located in any selected position opposite the trailing edge 24. The arm end portions 18 are clamped together to maintain this particular alignment of the wing between the end portions. The excess material is only removed along the leading edge 22 to modify the initially shaped wing to the shape shown in FIG. 25A.

A wing may also be initially shaped as for example from the sheet material 76 by positioning the folded edge 78 along the reference line 62, as illustrated in FIG. 28. When clamped in this position the material extending outwardly from between the shaped end portions 18 is cut away. The shape of a wing, as shown in FIG. 28A, cut in this manner closely resembles the wing of a stonefly nymph.

A further modification of this shape can be attained by the folded material alignment shown in FIG. 29. With this arrangement reference point 35 serves as a starting point for positioning of the folded edge 78 of the sheet material 76. The opposite end of the folded edge 78 is pivoted upwardly from reference point 31 with material fixed at point 35. The exposed material is then cut away to thereby form a dual wing unit having the configuration as shown in FIG. 29A.

An initially formed dual wing unit having the configuration illustrated in FIG. 20 may be modified in shape by the alignment arrangement illustrated in FIG. 26. Here a precut dual wing unit is positioned between the shaped end portions 18 in an inverted position with the upper tip and bottom trailing edge of the dual wing unit aligned with reference points 60 and 31. Excess material is trimmed along the leading edge 22 of the shaped end portion. The resultant dual wing configuration is shown in FIG. 26A.

The dual wing unit 74 shown in FIG. 27A is shaped in a manner similar to shaping the dual wing unit of FIG. 26A. However, as shown in FIG. 27, with the bottom front edge of the precut wing positioned on reference point 31, the upper tip is positioned to extend beyond the trailing edge 24 opposite a preselected point on trailing edge 24 between reference points 35 and 60. The portions of the dual wing unit 74 exposed are removed. The shape of the dual wing unit 74 formed in this manner is illustrated in FIG. 27A.

It will be apparent from the present invention that many variations in the configuration of an artificial fly wing may be obtained by the selective alignment of the wing forming material between the shaped end portions 18. Accordingly, the alignment is controlled by the provision of the above described aligning devices 34. Thus the wing forming apparatus 10 is operable to construct many wing shapes simulating the wings of many insect varieties.

In addition, the present invention includes the use of the wing forming apparatus 10 having shaped end portions 18 of a particular size, as illustrated in FIGS. 21 through 23. By providing a set of wing forming apparatus 10 with a preselected wing profile in a variety of sizes, it is possible to generate artificial lures of any size but having a uniform wing configuration. This feature also is adaptable to the known hook sizes in which the wing must have a dimension that is suitable for the respective hook size. Hooks come in a range of sizes for example sizes 4, 6, 8, 10, 12, 14, 16 and 18. Accordingly, a particular wing profile is provided with a size which corresponds to the selected hook size which is determined by the size of the artificial fly to be made. Thus regardless of the hook size, the correctly sized wing may be provided by gauging the wing forming apparatus to correspond with a preselected hook size. Accordingly, each device 10 is inscribed with a number matching the number of the hook size to indicate on what size hook the shaped wing should be mounted for best results.

According to the provisions of the patent statues, I have explained the principle, preferred construction and mode of operation of my invention and have illustrated and described what I now consider to represent its best embodiments. However, it should be understood that, within the scope of the appended claims, the invention may be practised otherwise than as specifically illustrated and described.

I claim:

1. Apparatus for forming the wings of a fishing lure comprising,
    a pair of cooperating arm members positioned in overlying spaced relationship,
    said arm members each having a first end portion and a second end portion,
    said first end portions being connected for pivotal movement of said arm members to move said second end portions toward and away from each other,
    said second end portions being adapted to receive a wing forming material therebetween,
    said arm members being movable between an open position where said second end portions are spaced apart and a closed position where said arm members are abutting,
    said second end portions each having a substantially identical configuration corresponding to a preselected wing configuration,
    alignment means provided on at least one of said arm member second end portions for selectively positioning the wing forming material between said second end portions in said closed position,
    said alignment means including a plurality of reference points located on at least one of said second end portions,
    said reference points being selectively positioned in spaced relation on said respective second end portion,
    a pair of said reference points defining at least one reference line extending between said reference points,
    said reference line forming a position indicator for the wing forming material between said second end portions, and
    said position indicator arranged to receive a preselected portion of the wing forming material in register with said position indicator to selectively orient the wing forming material between said second end portions in a preselected position corresponding to a preselected configuration for forming the wing.

2. Apparatus for forming the wings of a fishing lure as set forth in claim 1 which includes,
    said arm members being integrally formed from a unitary member,
    said unitary member being bent intermediate said first and second end portions to position said arm members oppositely of one another, and
    said second end portions being maintained in alignment to move into and out of overlying relation for forming a profile of a preselected wing configuration.

3. Apparatus for forming the wings of a fishing lure as set forth in claim 1 in which, said reference points being operable to permit controlled positioning of a feather in a preselected alignment between said second end portions in said second position.

4. Apparatus for forming the wings of a fishing lure as set forth in claim 1 in which,
said reference points being operable to permit controlled positioning of sheet material in a preselected alignment between said second end portions in said second position.

5. Apparatus for forming the wings of a fishing lure as set forth in claim 1 which includes,
extraction means provided on at least one of said arm members for removing excess material remaining on a wing formed from a feather.

6. Apparatus for forming the wings of a fishing lure as set forth in claim 5 in which,
said extraction means includes an opening extending through at least one of said arm members,
said opening being positioned in said arm member adjacent said second end portion thereof, and
said opening having a preselected size so that as the feather is drawn through said opening the feather is contacted by the portion of said arm member surrounding said opening to remove unwanted material from the wing.

7. Apparatus for forming the wings of a fishing lure as set forth in claim 1 which includes,
said pair of arm members each having lateral edge portions extending longitudinally between said first and second end portions,
a slot in one of said arm members,
said slot extending from one of said lateral edge portions a preselected distance into said arm member,
said slot having an open end portion and a closed end portion, and
said open end portion being adapted to receive the wing forming material and guide the wing forming material into a preselected position abutting said closed end portion and aligned between said second end portions of said arm members.

8. Apparatus for forming the wings of a fishing lure as set forth in claim 1 which includes,
said pair of reference points including a recessed portion and a slotted portion on at least one of said arm members,
said recessed portion being selectively positioned at the extreme end of said arm member second end portion,
said slotted portion being selectively positioned in said arm member spaced from said second end portion and being formed by an open end portion and a closed end portion, and
said recessed portion and said slotted portion open end portion defining end points of said reference line extending therebetween to form said position indicator for guiding a feather into a preselected position between second end portions to thereby control the shape of the wing formed from the feather.

9. Apparatus for forming the wings of a fishing lure as set forth in claim 1 which includes,
said reference line extending transversely across at least one of said arm members,
said reference line being located in preselected vertical distance from the extreme end portion of said arm member second end portion, and
said reference line being operable to locate an edge of a sheet material in a preselected position to thereby control the shape of the wing formed from the sheet material.

10. Apparatus for forming the wings of a fishing lure as set forth in claim 1 which includes,
anchoring means associated with at least one of said arm members for receiving the wing forming material to securely position the material in alignment with said alignment means when said arm members are in said closed position.

11. Method for forming the wing of a fishing lure comprising the steps of,
inserting wing forming material between the shaped end portions of a pair of cooperating arm members,
placing the wing forming material in abutting relation with one of the arm member end portions,
positioning a pair of selected points on the wing forming material in overlying relation with a pair of corresponding reference points located on at least one of the shaped end portions,
aligning a line extending between the pair of selected points on the wing forming material with a reference line extending between the reference points on the shaped end portions to selectively orient the wing forming material between the shaped end portions in a preselected position corresponding to a preselected configuration for forming the wing,
urging the arm member end portions into abutting relation to secure the wing forming material therebetween,
maintaining the wing forming material between the arm member end portions in selective alignment with the reference line, and
removing the material surrounding the arm member end portions to thereby form a wing of a preselected configuration.

12. Method for forming the wing of a fishing lure as set forth in claim 11 which includes,
maintaining a feather as the wing forming material in the preselected position aligned with the reference line between the shaped end portions,
burning the end portion of the feather exending outwardly from between the shaped end portions around the periphery thereof, and
shaping the feather to correspond with the profile of the shaped end portions to produce from the feather a formed wing having a preselected configuration.

13. Method for forming the wing of a fishing lure as set forth in claim 11 which includes,
maintaining a sheet material as the wing forming material in the preselected position aligned with the reference line between the shaped end portions,
cutting the portion of the sheet material extending outwardly from between the shaped end portions around the periphery thereof, and
shaping the sheet material to correspond with the profile of the shaped end portions to produce from the sheet material a formed wing having a preselected configuration.

14. Method for forming the wing of a fishing lure as set forth in claim 11 which includes,
anchoring the wing forming material in the aligned position between the shaped end portion by engagement with an opening extending through at least one of said arm members.

15. Method for forming the wing of a fishing lure as set forth in claim 14 which includes, extending the quill of a feather being the wing forming material through the opening, and compressing the arm members into abutting relation to immovably position the quill in the opening and thereby secure the feather in the preselected aligned portion for shaping the feather between the end portions.

16. Method for forming the wing of a fishing lure as set forth in claim 11 which includes, removing the formed wing from between the arm members by pulling the formed wing through a reduced opening in one of the arm members, and cleaning the formed wing of excess material remaining on the periphery of the formed wing by engagement of the wing with the arm member when pulled through the opening.

17. Method for forming the wing a fishing lure as set forth in claim 11 which includes, inserting a feather having a quill extending the length of the feather as the wing forming material between the shaped end portions of the arm member, aligning the quill with the reference line on the arm member end portion to locate the quill in a preselected position between the shaped end portions, securing the quill in the preselected position, and shaping the feather by removing the portion of the feather extending from between the shaped end portions to form a wing having a configuration corresponding to the profile of the arm member end portions with the quill located in a preselected position on the formed wing.

18. Method for forming the wing of a fishing lure as set forth in claim 11 which includes, inserting a feather having a quill extending the length of the feather as the wing forming material between the shaped end portions of the arm members, aligning the quill with the reference line by positioning the quill at one point in a recessed portion located at the extreme end of one of the arm member shaped end portions and at a second point in an opening extending through the same arm member, and tensioning the quill to extend along a preselected line on the shaped end portion between the recessed portion and the opening to orient the quill relative to the shaped end portions for forming from the feather a shaped wing having a quill located in a preselected position in the shaped wing.

19. Method for forming the wing of a fishing lure as set forth in claim 11 which includes, shaping the wing from a feather being the wing forming material by burning the portion of the feather extending from between the shaped end portions, and removing excess burned material remaining on the periphery of the shaped wing by pulling the feather through a reduced opening in one of the arm members so that the excess burned material is dislodged from the periphery of the shaped wing.

20. Method for forming the wing of a fishing lure as set forth in claim 11 which includes, inserting a sheet metal being the wing forming material between the shaped end portions of the arm members, aligning the sheet material with the reference line on the arm member end portion by positioning an edge of the material along the reference line extending transversely across the arm member adjacent the end portion, and maintaining the edge of the material aligned with the reference line as the sheet material is shaped to form a wing having a preselected configuration as determined by its position between the shaped end portions.

21. Method for forming the wing of a fishing lure as set forth in claim 11 which includes, reinserting a shaped wing formed from the wing material between the shaped end portions, selectively positioning the shaped wing on one of the shaped end portions so that a portion of the shaped wing extends beyond the periphery of the shaped end portion, clamping the end portions together to maintain the shaped wing in the selected position between the end portions, and removing the portion of the shaped wing extending outwardly from between the clamped end portions to thereby additionally shape the shaped wing with a preselected configuration.

* * * * *